(12) United States Patent
Browy

(10) Patent No.: US 11,821,723 B2
(45) Date of Patent: *Nov. 21, 2023

(54) PROJECTABLE DEVICE FOR USE WITH MIXED REALITY SYSTEM

(71) Applicant: Chosen Realities, LLC, Plantation, FL (US)

(72) Inventor: Eric Browy, Coral Springs, FL (US)

(73) Assignee: Chosen Realities, LLC, Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/804,499

(22) Filed: May 27, 2022

(65) Prior Publication Data

US 2022/0290958 A1 Sep. 15, 2022

Related U.S. Application Data

(63) Continuation of application No. 17/120,851, filed on Dec. 14, 2020, now Pat. No. 11,378,371, which is a continuation of application No. 16/445,510, filed on Jun. 19, 2019, now Pat. No. 10,895,444.

(60) Provisional application No. 62/688,222, filed on Jun. 21, 2018.

(51) Int. Cl.
*F42C 13/00* (2006.01)
*G06T 11/00* (2006.01)
*G02B 27/01* (2006.01)
*G06V 20/20* (2022.01)

(52) U.S. Cl.
CPC .......... *F42C 13/00* (2013.01); *G02B 27/0172* (2013.01); *G06T 11/00* (2013.01); *G06V 20/20* (2022.01); *G02B 2027/014* (2013.01); *G02B 2027/0141* (2013.01)

(58) Field of Classification Search
CPC ....................................................... F42C 13/00
USPC ......................................... 102/211, 214, 215
See application file for complete search history.

(56) References Cited

U.S. PATENT DOCUMENTS

| | | | |
|---|---|---|---|
| 3,557,701 A | 1/1971 | Arnell | |
| 4,884,137 A | 11/1989 | Hanson et al. | |
| 5,074,217 A | 12/1991 | Gabriels | |
| 5,106,033 A | 4/1992 | Phan | |
| 5,263,396 A | 11/1993 | Ladan et al. | |
| 10,895,444 B1 | 1/2021 | Browy | |
| 11,378,371 B2* | 7/2022 | Browy | G02B 27/017 |
| 2006/0229773 A1 | 10/2006 | Peretz et al. | |
| 2018/0059660 A1 | 3/2018 | Heatzig et al. | |

(Continued)

*Primary Examiner* — Bret Hayes
(74) *Attorney, Agent, or Firm* — Vista IP Law Group, LLP

(57) ABSTRACT

A peripheral device that is used with a mixed reality system that is thrown by the user of the mixed reality system and captures scene and mapping data of the area the peripheral is thrown into. Upon capturing the scene and mapping data, the peripheral transmits the data (in some embodiments, including processed results of evaluation of the data) to the mixed reality system. The mixed reality system displays a visual representation of the scene and mapping data on a near eye display. In some embodiments, the visual representation appears in real space enabling an effect where the user of the mixed reality system can see through walls or other obstructions. In some embodiments, the peripheral is configured to detonate upon the satisfaction of a variable set of conditions.

18 Claims, 7 Drawing Sheets

(56) References Cited

U.S. PATENT DOCUMENTS

| | | |
|---|---|---|
| 2018/0173323 A1 | 6/2018 | Harvey et al. |
| 2018/0232051 A1 | 8/2018 | Wu et al. |

\* cited by examiner

PROJECTABLE DEVICE FOR USE WITH MIXED REALITY SYSTEM

CROSS-REFERENCE TO RELATED APPLICATION

The present application is a continuation of U.S. patent application Ser. No. 17/120,851, entitled "PROJECTABLE DEVICE FOR USE WITH MIXED REALITY SYSTEM," filed Dec. 14, 2020, which is a continuation of U.S. patent application Ser. No. 16/445,510, entitled "Device Performing Simultaneous Localization and Mapping," filed on Jun. 19, 2019, and claims the benefit of priority under 35 U.S.C. § 119(e) of U.S. Provisional Patent Application Ser. No. 62/688,222, entitled "Throwable Device Performing Simultaneous Localization and Mapping," filed on Jun. 21, 2018. The entire contents of the aforementioned priority documents are hereby explicitly incorporated by reference into the present disclosure for all purposes.

INCORPORATION BY REFERENCE

U.S. patent application Ser. No. 15/600,545/U.S. Publication. No. 2017/0337470, filed on May 19, 2017 and entitled "METHOD AND SYSTEM FOR PERFORMING CONVOLUTIONAL IMAGE TRANSFORMATION ESTIMATION"; and U.S. patent application Ser. No. 15/717,747/U.S. Publication No. 2018/0096503, filed on Oct. 10, 2016 and entitled "PERIOCULAR TEST FOR MIXED REALITY CALIBRATION" are hereby explicitly incorporated by reference into the present disclosure for all purposes.

TECHNICAL FIELD

This disclosure relates to mixed reality systems. More particularly, this disclosure relates to a mixed reality system that provides analysis on real world conditions through a GUI.

BACKGROUND

Virtual Modern computing and display technologies have facilitated the development of systems for so called "virtual reality," "augmented reality," or "mixed reality" experiences, wherein digitally reproduced images or portions thereof are presented to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user; a mixed reality, or "MR," relates to merging real and virtual worlds to produce new environments where physical and virtual objects co-exist and interact in real time. An example process used to interpret scene data is with simultaneous localization and mapping (SLAM).

SUMMARY

The present disclosure is generally directed to generating scene and/or mapping data for an environment, through use of a projectable device such as a throwable grenade and/or (e.g., piloted, autonomous, or semi-autonomous) drone. More specifically, the present disclosure is directed to generating scene and/or mapping data for an environment, through use of a projectable device that can be detonated after the scene and/or mapping data is generated, analyzed, and/or wirelessly communicated to at least one mixed reality system.

Embodiments of the present disclosure include a method performed by a projectable device, the method performing the following operations: establishing a wireless pairing between the projectable device and a mixed reality (MR) system, the wireless pairing enabling communication between the projectable device and the MR system; receiving scene and mapping data for an environment in proximity to the projectable device, the scene and mapping data captured by one or more cameras of the projectable device; transmitting the scene and mapping data to the MR system through the wireless pairing; and initiating a detonation of the projectable device using a detonation charge included in the projectable device.

Embodiments of the present disclosure can also optionally include one or more of the following aspects: the operations further include analyzing the scene and mapping data to generate information describing a presence of one or more people in proximity to the projectable device and an intent of the one or more people; the operations further include transmitting the information to the MR system through the wireless pairing; the detonation is initiated based at least partly on the intent; the operations further include receiving an indication to transition the projectable device from a low power mode to an active mode, wherein the scene and mapping data is captured by the one or more cameras when the projectable device is in the active mode; the indication is provided through manipulation of a switch or a pin on the projectable device; the indication is provided through an activation instruction that is transmitted to the projectable device from the MR system through the wireless pairing; the detonation is initiated responsive to a detonation instruction received from the MR system through the wireless pairing; the detonation is initiated responsive to motion data indicating that the projectable device has come to a stop following a period of motion, the motion data generated by at least one accelerometer in the projectable device; the projectable device is a throwable grenade; and/or the projectable device is a drone.

Embodiments of the present disclosure also include a projectable device (e.g., drone, grenade, etc.) configured to perform operations described herein. Embodiments of the present disclosure also include a system, including a projectable device, configured to perform operations described herein. Embodiments of the present disclosure also include memory (e.g., computer-readable storage media) that stores instructions that are executable perform operations described herein.

DETAILED DESCRIPTION

Figure 1:
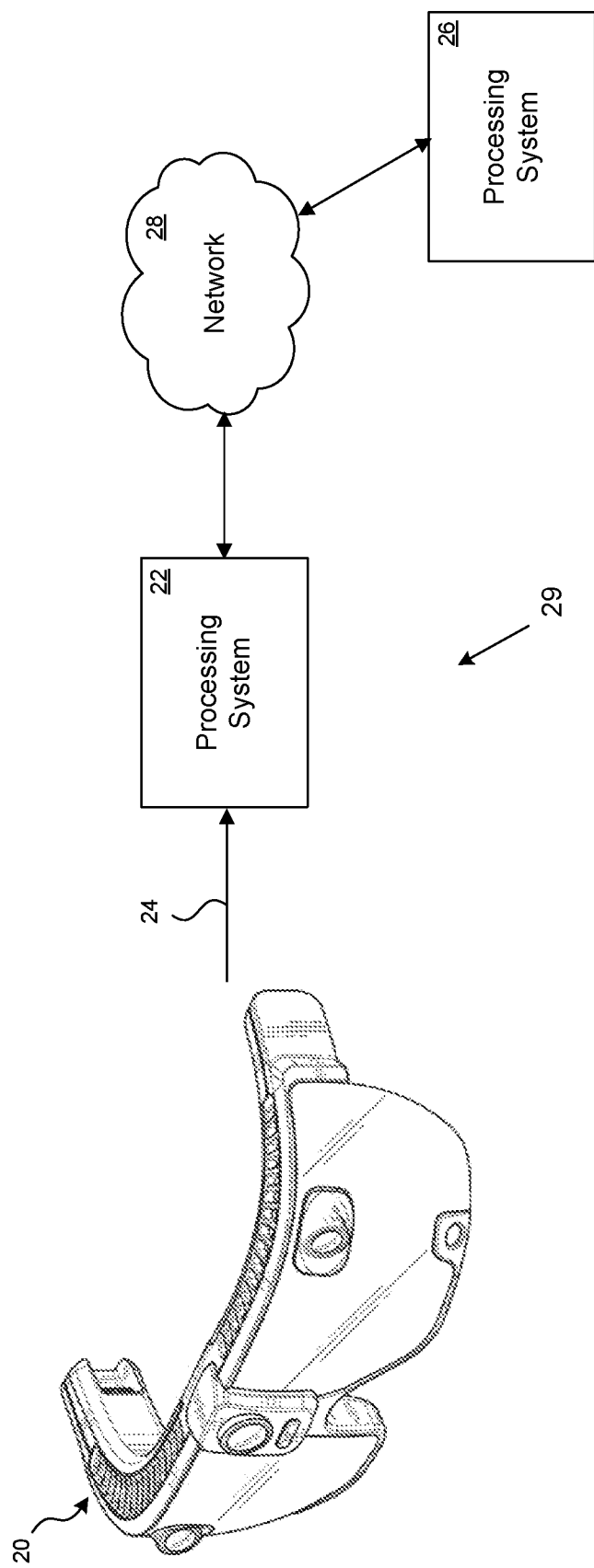
FIG. 1 shows an example of an environment in which a mixed reality enabled head-mounted display device (hereinafter "HMD device") can be used.

In this description, references to "an embodiment," "one embodiment" or the like mean that the particular feature, function, structure or characteristic being described is included in at least one embodiment introduced here. Occurrences of such phrases in this specification do not necessarily all refer to the same embodiment. On the other hand, the embodiments referred to also are not necessarily mutually exclusive.

The figures and related text describe certain embodiments of an illumination module suitable for use in near-to-eye display (NED) systems, such as HMD devices. However, the disclosed embodiments are not limited to NED systems and have a variety of possible applications, including any active illumination systems (i.e., actively using light sources) such as used in active light projection systems or any active camera modules. Further included is a sensor suite of weapon system-connected sensors. All such applications, improvements, or modifications are considered within the scope of the concepts disclosed here.

The following description generally assumes that a "user" of a display device is a human. Note, however, that a user that is not human, such as a machine or an animal, can potentially use a display device of the disclosed embodiments. Hence, the term "user" can refer to any of those possibilities, except as may be otherwise stated or evident from the context. Further, the term "optical receptor" is used here as a general term to refer to a human eye, an animal eye, or a machine-implemented optical sensor designed to detect an image in a manner analogous to a human eye.

Virtual reality (VR) or augmented reality (AR) enabled HMD devices and other NED systems may include transparent display elements that enable users to see concurrently both the real world around them and AR content displayed by the HMD devices. An HMD device may include components such as light-emission elements (e.g., light emitting diodes (LEDs)), waveguides, various types of sensors, and processing electronics. HMD devices may further include one or more imager devices to generate images (e.g., stereo pair images for 3D vision) in accordance with the environment of a user wearing the HMD device, based on measurements and calculations determined from the components included in the HMD device.

A mixed reality system may also include a depth sensing system that resolves distances between an HMD device worn by a user and physical surfaces of objects in the user's immediate vicinity (e.g., walls, furniture, people and other objects). The depth sensing system may include a depth camera (e.g., measurements based on the phase of light, time of flight, parallax or stereo images, etc.) that is used to produce a 3D image of the user's nearby real-world environment. The captured image has pixel values corresponding to the distances between the HMD device and points of the real-world environment.

Object recognitions may be performed using a variety of computer vision techniques. For example, the wearable system can analyze the images acquired by the outward-facing imaging system to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, apriori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

FIG. 1 schematically shows an example of an environment in which an HMD device 20 can be used, where such HMD device 20 can implement the techniques introduced here. In the illustrated example, the HMD device 20 is configured to communicate data to and from an external processing system 22 through a connection 24, which can be a wired connection, a wireless connection, or a combination thereof. In other use cases, however, the HMD device 20 may operate as a standalone device. The connection 24 can be configured to carry any kind of data, such as image data (e.g., still images and/or full-motion video, including 2D and 3D images), audio, multimedia, voice, and/or any other type(s) of data. The processing system 22 may be, for example, a game console, personal computer, tablet computer, smartphone, or other type of processing device. The connection 24 can be, for example, a universal serial bus (USB) connection, Wi-Fi connection, Bluetooth or Bluetooth Low Energy (BLE) connection, Ethernet connection, cable connection, digital subscriber line (DSL) connection, cellular connection (e.g., 3G, LTE/4G or 5G), or the like, or a combination thereof. Additionally, the processing system 22 may communicate with one or more other processing systems 16 via a network 18, which may be or include, for example, a local area network (LAN), a wide area network (WAN), an intranet, a metropolitan area network (MAN), the global Internet, or combinations thereof. Above components contribute to the mixed reality system 29.

Figure 2:
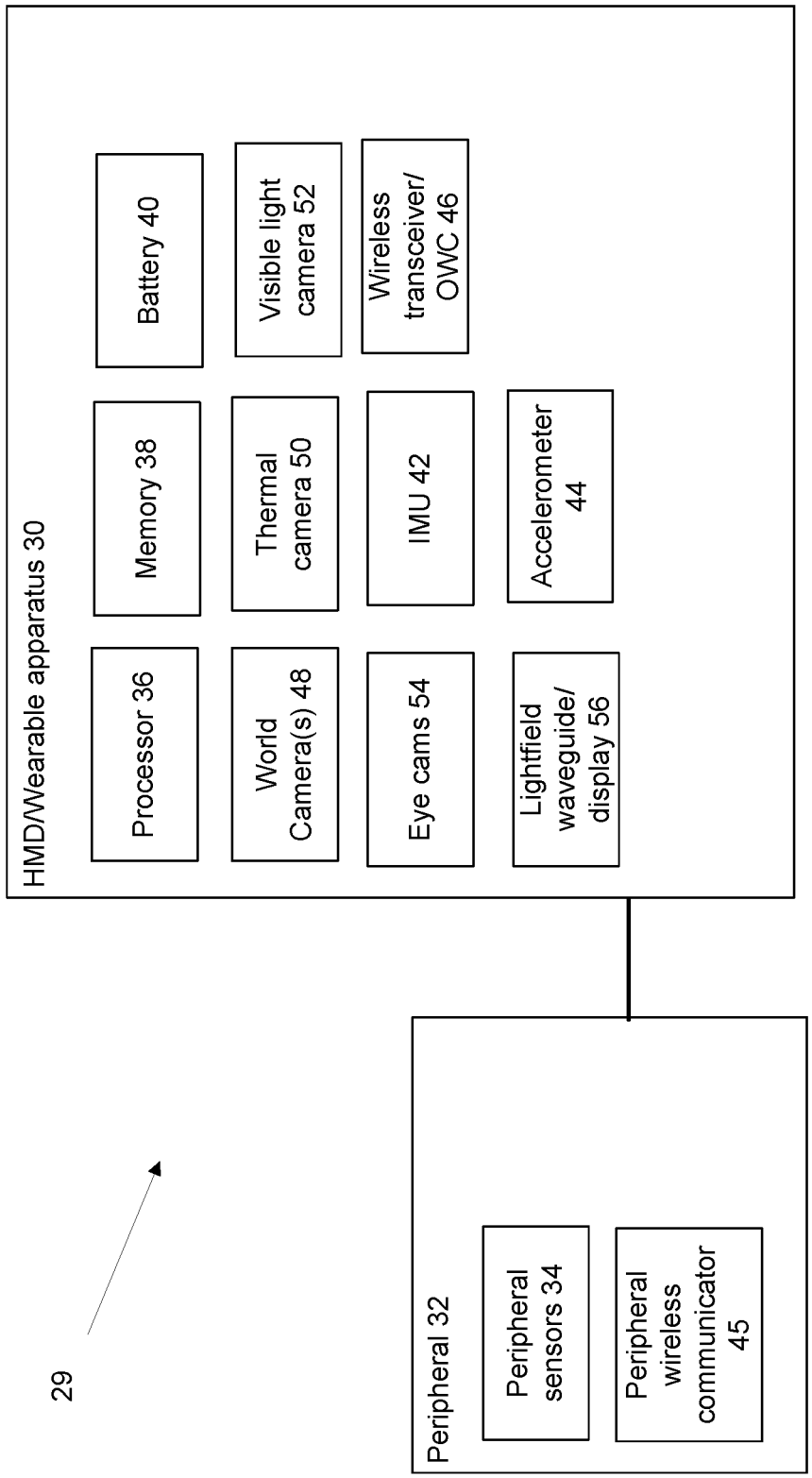
FIG. 2 is a block diagram of hardware and software module interactions in an environment-oriented mixed reality system.

FIG. 2 is a block diagram of hardware and software module interactions in an environment-oriented mixed reality system 29. The system includes an HMD/wearable apparatus 30 as well as a peripheral 32 with mounted sensors 34. The wearable apparatus 30 is processor-operated 36, includes a local memory/digital storage 38, and is powered by a battery 40. The peripheral 32 may be an electronic device (e.g., a mobile phone), a mechanical device (e.g., a weapon system) or a totem object (e.g., a broom) that serves an additional or alterative purpose in virtual or augmented reality. Embodiments of the wearable apparatus 30 may include multiple physical components. Examples include an HMD and an additional unit such as a beltpack or backpack. The additional unit may include batteries and additional processing such as graphical processing and light field/scene rendering.

Other examples of worn units/peripherals 32 include biometric gloves. The biometric gloves include motion sensors that track finger movement to high degrees of precision. The wearable apparatus 30 further includes a suite of motion detection sensors such as inertial motion units (IMU) 42 and accelerometers 44. IMUs 42 may be based on a number of hardware configurations such as gyroscopes to detect free space motion and orientation and magnetic fields to detect motion between local devices (e.g., an HMD and a belt pack, or peripheral). The motion detection sensors enable the mixed reality system 29 to monitor motion of the user both in space and in pose, positioning, and orientation. The peripheral 32 further includes a wireless communication system 45 in order to transmit sensor data to the worn apparatus 30. In some embodiments, the mixed reality system 29 does not include a peripheral device 32

The worn system further includes a means for wireless communication 46 with a network, and with other mixed reality systems 29. The means for wireless communication includes network chips and associated antenna for Wi-Fi/IEEE 802.11 communication as well as Bluetooth, Zigbee, NFC, Bluetooth Low Energy, and cellular data protocols. The previously referenced protocols are often subject to interference and jamming behaviors (especially in combat zones). Further means for wireless communication include Optical wireless communication (OWC) such as an IR strobe and laser communication. IR strobes and laser communication are effective when in line of sight, and as scattered off local surfaces. IR systems are effective against jamming behavior because flooding an area with more IR light than the sun already does is sufficiently difficult to dissuade jamming. Jamming a laser communication system requires direct targeting jamming efforts against specific receivers.

In some embodiments, the IR strobe and laser communication may be used in conjunction. The IR strobe signals to nearby mixed reality systems 29 how and where to aim and transmit via laser communication. OWC communication uses both an emitter and a detector. The detector identifies a source of the IR strobe, and a laser emitter aims at the IR strobe. In order to reduce mechanical parts, the receiver for the laser transmitter may be a number of panels worn by a user. In some embodiments, the laser transmitter may transmit in a cone from the forward-facing perspective of a first user. Using a cone projection technique, the first user is able to transmit by looking at a second user. Reply communication can be performed by the IR strobe in a less directional manner. In use, the described scheme of IR strobe and laser communication enables communication between soldiers who may or may not be looking at one another at any given moment.

The HMD 30 includes a number of cameras including a scene mapping and depth sensing system ("world camera") 48, a thermal camera 50, a visible light camera 52, and an eye tracking sensor 54. The eye tracking sensor tracks the direction in which eyes are looking as well as identifies data about pupils (e.g., size, focus, rate of adjustment). The HMD 30 further includes a display screen 56 upon which digital images are displayed to the user. The display may comprise a waveguide or other lens system that enables viewing of the physical world in addition to the inclusion of digital elements. The display screen may also provide overlay images that affect contrast of the surrounding environment to improve vision in low light. The overlays are informed by the depth sensing system and the thermal camera 50. While the device is "aware" of the surrounding scene using non-visible light, the scene may be re-rendered for the viewer using visible light for the user. The appearance is that of improved contrast for the wearer.

Both the eye tracking sensor 54 and the biometric glove are operable to determine a level of fatigue or alertness in a wearer. The biometric gloves collect finger movement data and combine those with known times of display of digital elements, and/or eye tracking data to monitor premotor neuron activity and response time to stimulus. For example, when the eye tracking sensor 54 identifies that the wearer looks at a first object, a timer is initiated. The timer is ended when finger movement data indicates that the wearer is reacting to observing the first object. Similarly, when a new object becomes displayed on the HMD 30, the eye tracking sensor 54 may time how long it takes for the wearer to look at the new object, and how quickly their pupils focus on the new object. The biometric data enables the establishing of a metric for measuring fatigue of the wearer.

The peripheral includes sensors similar to that of the HMD 30. The peripheral 32 includes motion sensors 34, such as an IMU that tracks the peripheral motion relative to the worn apparatus and cameras for both visible and non-visible light. Where the peripheral is a weapon system, the peripheral sensors 34 include calibration relative to the weapon system loadout (e.g., ammunition type and count) and shape (e.g., positioning of barrel compared to positioning of the camera).

The mixed reality system 29 includes a plurality of software modules that enable processing of the numerous input streams and process data that is not perceptible to humans. Additionally, some embodiments may omit some of the aforementioned components and/or may include additional components not discussed above nor shown in FIG. 2.

The mixed reality system 29 can be implemented in a squad/team/group configuration. In group embodiments, a number of mixed reality systems 29, worn by a group of users, coordinate and share data therebetween. Scene capture and mapping, such as SLAM algorithms, from multiple mixed reality systems 29 can be used in an interconnected fashion to enable mapping of a broader area. Each mixed reality system 29 includes world/depth cameras 48. Through the operation of the world cameras on each mixed reality system 29, a greater portion of a local area can be rendered and visually represented on each of the mixed reality systems 29.

For example, a first user may be standing inside a first room and a second user may stand outside of the first room. The world camera of the first user captures the scene of the first room and transmits that scene to the mixed reality system 29 of the second user. The second user's mixed reality system 29 then displays the captured scene of the first room in real time and real space. The effect of the display of the first room to the second user is that the first room appears to the second user as if there were no walls to the first room obstructing the second user's view.

As applied across a group of mixed reality systems 29, a local area may be mapped in real space and displayed "without walls." Placing the visual representation in real space is performed using the known distances between the SLAM grenade and the mixed reality system(s) 29 as well as the known distances from the SLAM grenade and the mixed reality system(s) 29 to other objects in the respective scene of each device.

As users move around, mapping data for a given area is no longer being captured in real time. Depending on the implementation and the use pattern, "stale" mapping data can become a liability. For example, if a user is shown that a room is empty and enters casually, an enemy may have entered the room after real-time data ceased. The enemy is then able to surprise the user. To avoid such a circumstance, mapping data that is not being captured in real time can fade or may be displayed differently (e.g., displayed in muted or greyed colors).

In some embodiments, a mixed reality system such as system 29 can communicate wirelessly with a device that can be projected (e.g., thrown, transported, piloted, or otherwise physically moved) into an environment that is remote from the mixed reality system and/or the user of the system. Such a projectable device can include cameras and/or other sensors that collect information regarding the environment into which the device is projected. The collected information can be analyzed on the device itself and/or communicated to the mixed reality system for further analysis. Such analysis can include SLAM performed for scene capture and mapping of the environment. In some examples, the projectable device is a thrown object such as a grenade. In other examples, the projectable device is a flown object such as a (e.g., remotely piloted, autonomous, or semi-autonomous) drone. The projectable device may be other suitable types of objects.

Figure 3:
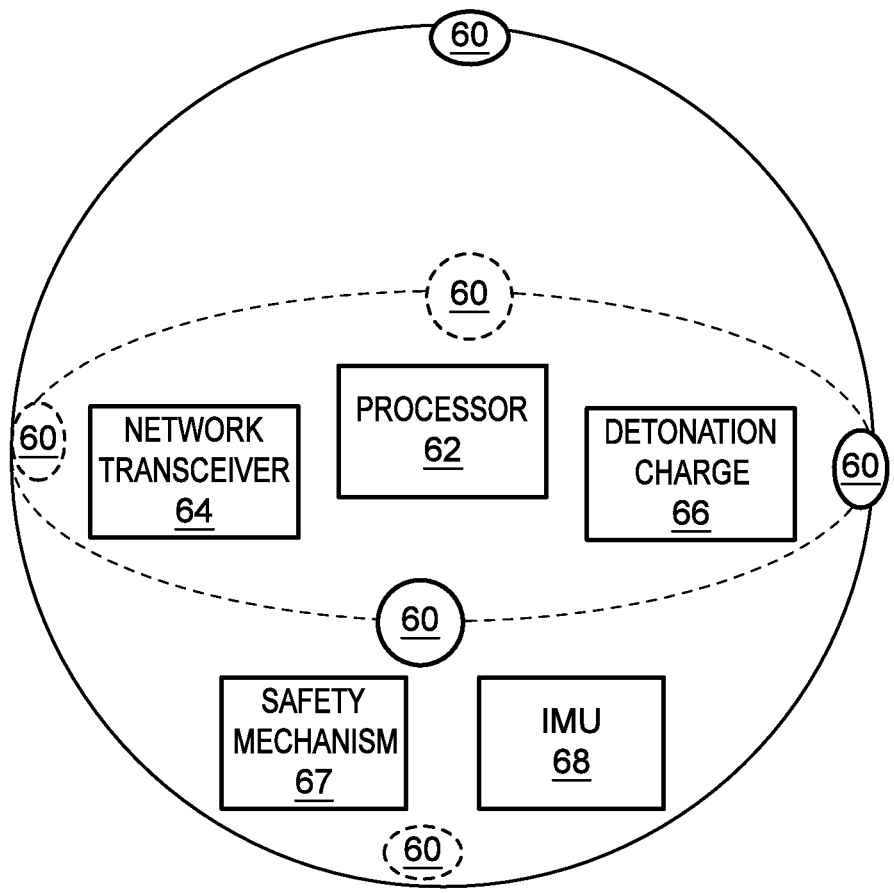
FIG. 3 is a block diagram of a SLAM-based grenade.

FIG. 3 is a block diagram of a SLAM-based grenade 58. The SLAM grenade 58 is a throwable item including a number of depth cameras 60 oriented around the device, a processor 62, a wireless transceiver 64 and a detonation charge 66. The detonation charge 66 may be in any style grenades include (e.g., fragmentation, smoke, flash, etc.). In some embodiments, the exterior of the SLAM grenade 58 is "sticky." The stickiness is achieved by any of magnets, adhesive or adhesive jelly/putty. In embodiments including adhesive, an additional handle may be mounted to the grenade for handling.

The SLAM grenade 58 is configured to capture ambient scene mapping data and transmit the mapping data to a corresponding HMD (or set of HMDs working together). The mapping data is translated into a visual representation of a room into which the SLAM grenade 58 is thrown. The visual representation is displayed on corresponding mixed reality systems 29 in real space using an augmented reality display. The room's visual representation enables the user to view the room the SLAM grenade 58 was thrown into as if no walls obscured the user's view of the room. The ability to "see" into a room before entering the room enables users in combat scenarios to evaluate danger of a room from the relative safety of an external position. As an alternative to real space presentation, in some embodiments, the room mapped by the SLAM grenade 58 may be represented in a "picture-in-a-picture" format. In an augmented reality circumstance, the wider "picture" is real world view via the user's eyes. The smaller "picture" is an augmented reality overlay.

Like the function of a group of mixed reality systems 29, the SLAM grenade 58 acts as an additional mixed reality system 29 in the group to provide scene and mapping data to members of the group. When the scene/mapping data is no longer captured in real time, the visual representation of the room the SLAM grenade 58 is in can decay/fade/lose color over time.

In some embodiments, the SLAM grenade 58 is configured to recognize people as distinct from other objects in the room into which the SLAM grenade 58 is thrown. Person/human recognition can be performed using machine learning/deep learning neural nets/image recognition techniques. Data regarding persons in the room is processed by the mixed reality system 29 to identify the intent of those persons (e.g., by pose, clothing, and possessions including weapons). In some embodiments, the SLAM grenade 58 is configured to detonate where persons are detected in the room. Limitations on detonation are further customizable. For example, detonation may be prevented when a friendly user (as identified by wearing a mixed reality system, or other IFF tag) is within blast range of the SLAM grenade 58. Another available limitation is to prevent detonation based on an evaluated intent of detected persons. For example, if the detected persons do not appear as enemy combatants, the grenade does not detonate. Evaluation for enemy status can be based on, for example, whether detected persons are carrying weapons.

The result of selective detonation is that the same SLAM grenade 58 may be used for multiple rooms. A user or group of users can work their way through a building by beginning every room breach by throwing the SLAM grenade 58 in first. The SLAM grenade 58 enables evaluation of each room before subjecting users to the dangers of a room, and neutralizes threats where they exist. Selective detonation further addresses the downsides of throwing a live grenade in every room. Grenades are not wasted on empty rooms, thus addressing a user's ability to carry a limited number of grenades. Further, the element of surprise is not blown on an empty room.

The SLAM grenade 58 operates using a battery. Thus, power conservation is an important aspect of operation. Combat hardware is built with reliability in mind. In order to conserve power in the field, the SLAM grenade 58 includes both an active mode and a lower power state. An example of a trigger that causes the SLAM grenade 58 to shift from one power state to another is an accelerometer threshold. The typical grenade toss has an identifiable velocity pattern that is distinct from hip mounted running. The velocity pattern can be detected by an IMU 68 within the SLAM grenade 58. In some embodiments, the power state is shifted based on the toggling of a physical switch, or removal of a pin.

An example of multiple power states that may be applied are similar to those employed in devices using machine-to-machine wireless protocol (e.g., Zigbee, Bluetooth, IEEE 802.15). The SLAM grenade 58 is configured to pair with a mixed reality system 29 and then remain in a low power mode until in use. When in active mode, the SLAM grenade 58 transmits scene and mapping data to the paired mixed reality system 29.

Figure 4:
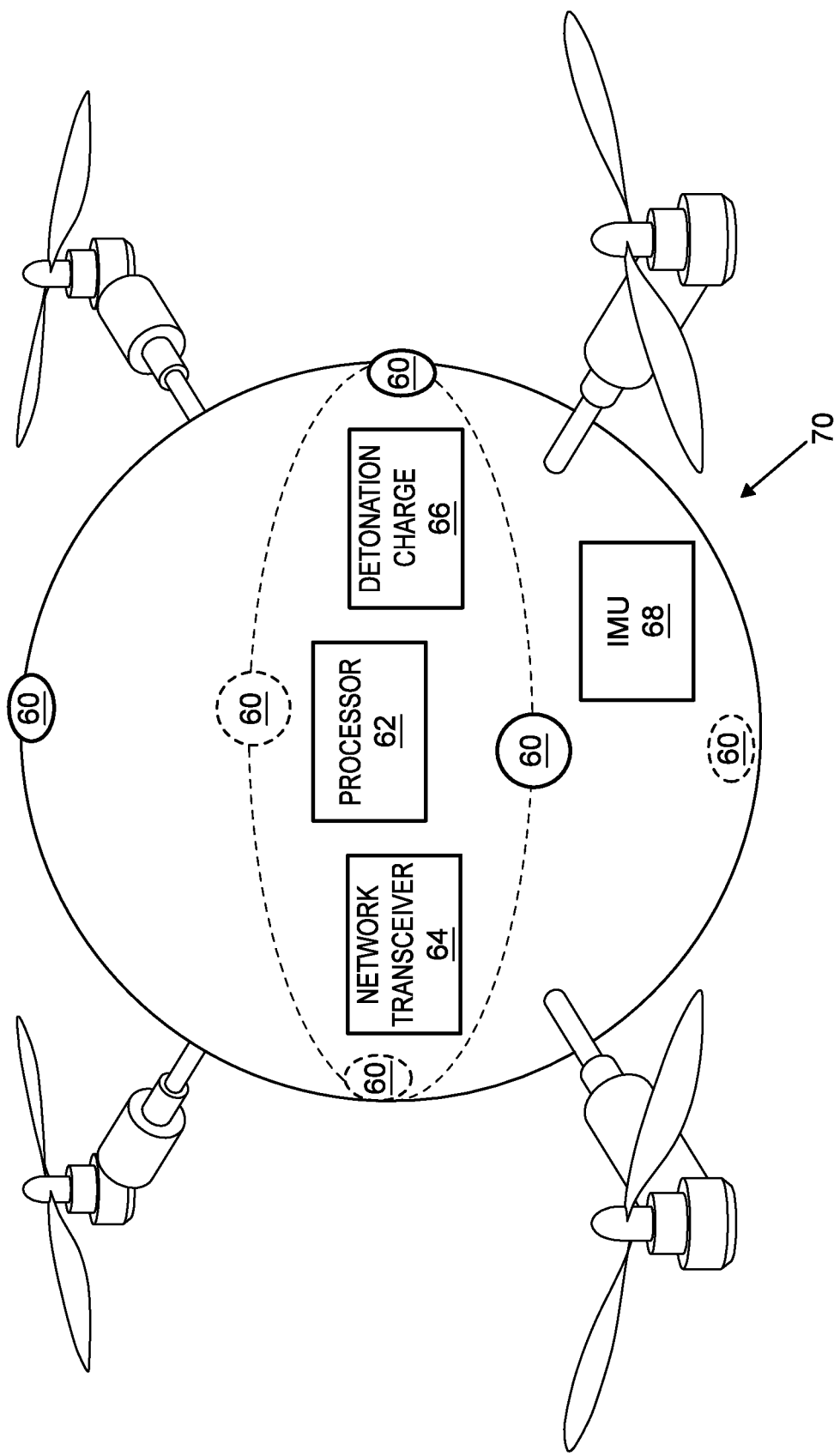
FIG. 4 is a block diagram of a SLAM-based drone

FIG. 4 is a block diagram of a SLAM-based drone 70. Like a SLAM grenade 58, a SLAM drone 70 is thrown into a room prior to human entry. Where a SLAM grenade 58 would follow a parabolic flight path and experience the physics of wall bounces and rolling (and in some embodiments, wall sticking), the drone operates on a parabolic path transitioned to programmed flight. Drones can be programmed to begin flight operation upon being thrown.

SLAM drones 70 include similar circuitry as SLAM grenades 58, and in some cases, a detonation charge 66. The primary distinction between a SLAM grenade 58 and a SLAM drone 70 is that the SLAM drone 70 includes powered flight. The SLAM drone 70 may include a number of flight profiles.

A first example of a flight profile is an observation profile. The observation profile is configured to fly into a high location in the room (determined based on scene and mapping data) and stay out of the way. In some embodiments, the observation profile is configured to make continuous erratic movements in order to present a less appealing target for enemy combatants.

A second example of a flight profile is a seek or distraction profile. The seek profile is configured to identify a person in the room and fly straight at them. The seek profile is intended to be used with a detonation charge 66 to provide single target effectiveness, or to act as a distracting element. An enemy combatant may have difficulty ignoring a drone flying straight at them. The charging SLAM drone 70 serves as an able distraction for users of the mixed reality system 29 who are attempting to breach the room.

A third example of a flight profile is a maximum damage profile. The maximum damage profile is configured to fly toward a central point between a number of detected persons in a room such that upon reaching that point, the detonation charge can have the maximum effectiveness.

Based on the chosen flight profile, the SLAM drone 70 may make use of variable flight speed. In some of the above flight profiles, an ideal speed is one where persons in the room the SLAM drone 70 flies into can clearly focus on the drone. In other flight profiles, the ideal speed for the SLAM drone 70 is as fast as possible in order to present a more difficult target.

Figure 5:
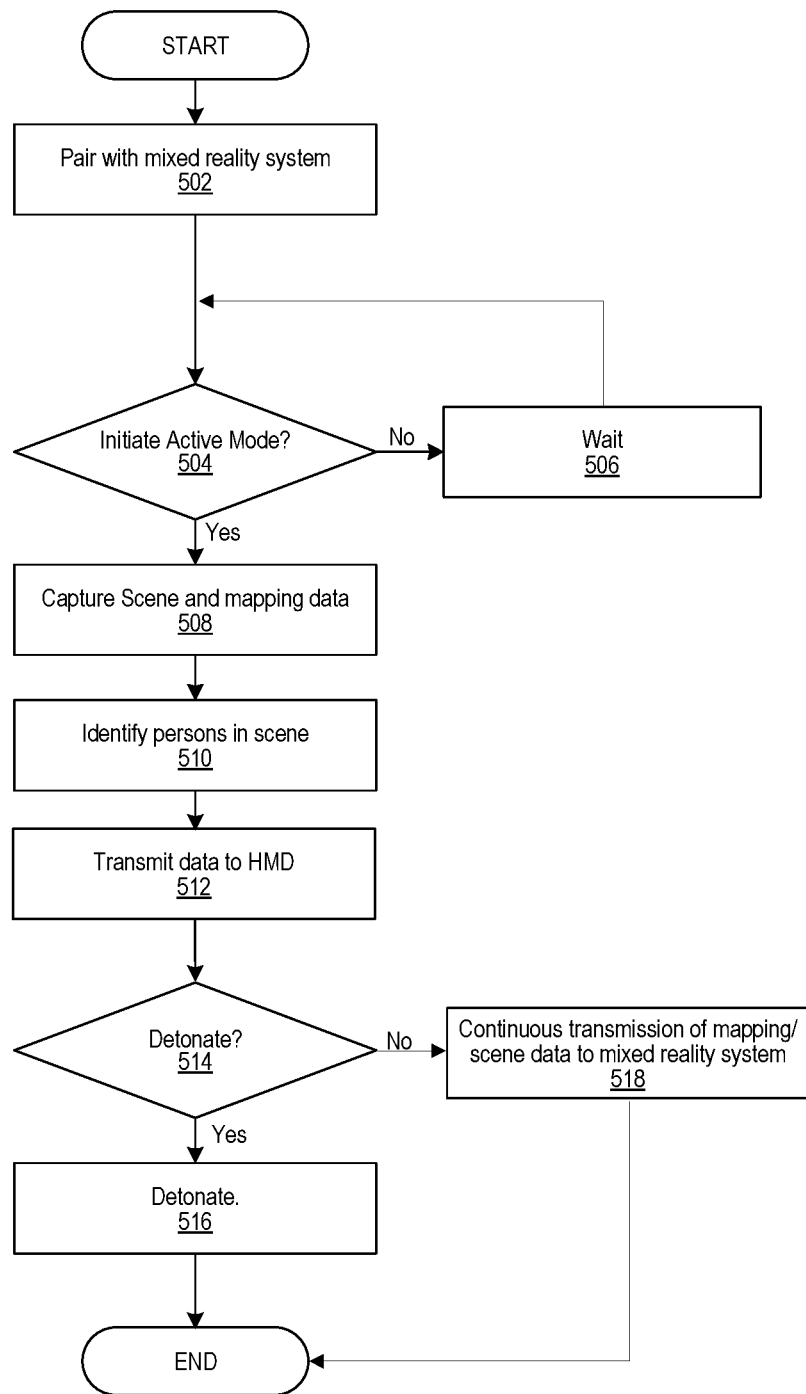
FIG. 5 is a flow chart illustrating operation of a SLAM grenade.

FIG. 5 is a flow chart illustrating operation of a SLAM grenade. In step 502, the SLAM grenade pairs with the mixed reality system. The pairing enables streamlined wireless communication therebetween. In some embodiments, the SLAM grenade pairs with multiple mixed reality systems and transmits data to a number of mixed reality systems at a time. In some embodiments, the mixed reality systems share the transmissions of the SLAM grenade in a peer-to-peer fashion.

In step 504, the SLAM grenade determines whether to operate in active mode or low power mode. Power mode determinations are made based on whether the SLAM grenade is in use. Use is determined by user input (e.g., such as a switch, a pin, or a command received through the paired mixed reality system), or environmental input (e.g., detection of a predetermined velocity or acceleration pattern). Where the active power mode is not engaged, in step 506, the SLAM grenade remains in a low power mode and waits for a trigger to initiate active mode.

Where the active power mode is engaged, in step 508, the SLAM grenade uses the local cameras to capture scene and mapping data. In some embodiments, the SLAM grenade executes the SLAM (or similar) algorithm on the captured scene and mapping data. In step 510, the SLAM grenade recognizes people from the scene and mapping data. The recognized people are further evaluated for intent. In some embodiments, computational cost of step 510 is pushed to the mixed reality system once the mixed reality system receives the relevant scene and mapping data. In step 512, the SLAM grenade transmits scene and mapping data (along with results of any processing performed thereon) to the paired mixed reality system. The mixed reality system is able to make use of the data as appropriate. In some embodiments, the mixed reality system can use the scene data to display the scene in augmented reality in real space and real time. The scene appears as if there are no intervening walls that prevent the user of the mixed reality system from seeing into the room occupied by the SLAM grenade.

In step 514, the SLAM grenade determines whether to detonate. The determination whether to detonate is based on any of user input and/or environmental input. User input may be direct commands received by the mixed reality system (e.g., voice, hand gesture, etc.) or based on input received on the SLAM grenade (e.g., a trigger and a timer). Environmental input is based on the onboard sensors of the SLAM grenade including an accelerometer and the world cameras. For example, if the accelerometer detects in velocity patterns matching thrown flight (e.g., parabolic motion), a detonation trigger may occur after the SLAM grenade comes to a complete stop.

Another example is that the SLAM grenade detonates based on the detection/recognition of persons present in the room with the SLAM grenade. Often, one does not want to use a grenade on an empty room, thus triggering detonation upon the detection of people saves grenades. Alternatively, in some applications (such as quarry or avalanche blasting), one only wants to detonate the grenade where no people are. In such circumstances, triggering detonation based on the lack of people saves lives.

Several safety measures can be applied to the determination whether to detonate. For example, when conditioned upon the detection of people, there may be a countdown timer of limiting when people detection begins. If the SLAM grenade is active upon the initiation of a throwing motion, the grenade detects the thrower (user). Detonating in the user's hand is an undesired result. As a further safety measure, the grenade may prevent the detonation trigger upon detection of a paired or friendly mixed reality system within the blast radius. Determination of blast radius is performed using the depth/world cameras to evaluate objects within the blast radius. The blast radius is predetermined based on the size of the detonation charge. Identification of the user by the world cameras can be performed using wireless signal strength (RSSI) combined with recognition of a person at the calculated distance using the depth camera.

Further evaluation of the blast radius is performed using machine learning to identify the strength/integrity of obstructions between the grenade and the user. For example, if a steel or concrete wall is between the user and the grenade, the blast radius that may affect the user is significantly reduced. The evaluation of obstruction integrity can be performed by the SLAM grenade, the mixed reality system, or both in concert. For example, thickness of a wall can be determined based on known values of distance between the user and the grenade, the distance between the user and the wall, and the distance between the grenade and the wall (e.g., total distance=grenade to wall+user to wall+ thickness of wall, solve for thickness of wall). The material of the wall is determined based on a computer vision evaluation. Wall or obstruction thickness and material composition enables the mixed reality system/SLAM grenade to evaluate the danger of detonation to the user or allies of the user.

The detonation evaluation may be performed continuously as circumstances around the SLAM grenade change. That is, a thrown grenade may initially not detonate until the user and the user's allies are at a safe distance. Once allied parties reach a safe distance, the grenade may detonate. Similarly, a thrown grenade may not initially detect non-allied persons. However, upon the subsequent detection of a non-allied person, the SLAM grenade may trigger detonation.

In step 516, the SLAM grenade detonates. The detonation may be triggered internally within the grenade, based on a command from the mixed reality system, or by coordination between the grenade, the mixed reality system, and any other local friendly mixed reality systems. Where the determination is made to not detonate, in step 518, the SLAM grenade continues to transmit scene and mapping data to the mixed reality system in real time. The transmission continues until the SLAM grenade is deactivated or placed on inactive/low power mode.

Figure 6:
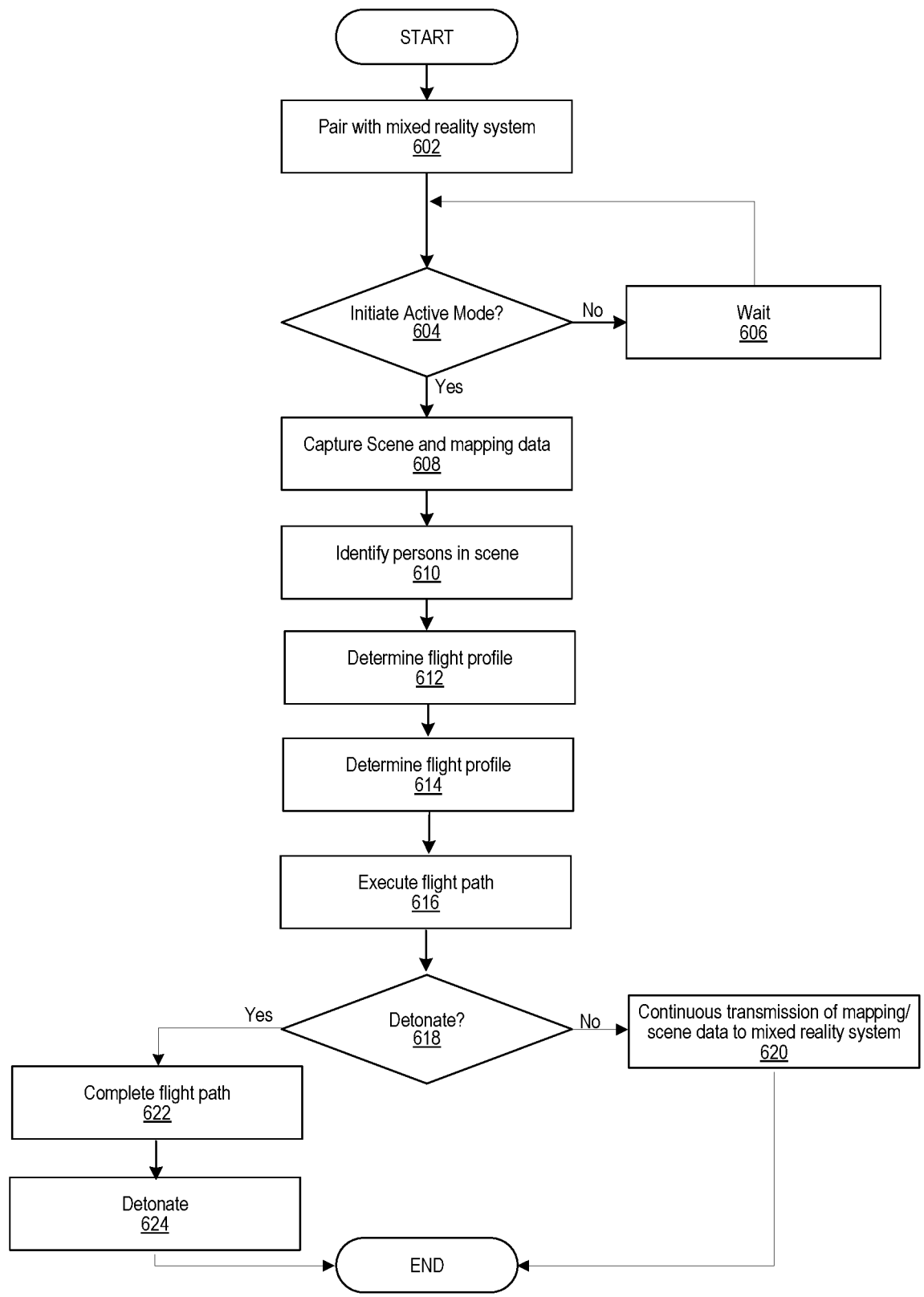
FIG. 6 is a flow chart illustrating operation of a SLAM drone.

FIG. 6 is a flow chart illustrating operation of a SLAM drone. The SLAM drone operates similarly to the SLAM grenade with a number of notable variations. As an example of one of these variations, in step 612, the SLAM drone determines a flight profile. The determination of the flight profile begins in response to the drone being thrown, or otherwise put into the air. The flight profile may be determined by predetermined programming, user controls, or contextual/environmental input.

An example of contextual or environmental input is whether the SLAM drone detects allied/non-allied persons and where those persons are relative to the SLAM drone. A second example of a contextual or environmental input is the size and shape of the room into which the SLAM drone is inserted. If a ceiling is higher than average, the drone may fly higher than average.

User input is useful to determine flight profiles where tactical decisions are made. For example, the role the SLAM drone is intended to take in a room breach affects the ideal flight behavior of the SLAM drone. Where the drone is intended to be a distraction, flying straight at non-allied persons detected is distracting. Where the drone is intended to gather information only, flying around in an erratic pattern with line of sight to most objects in the room is preferable. Where the drone is intended to do damage, flying to the center of a group of non-allied persons and detonating is preferred.

In step 616, the drone executes the determined flight path. Notably, the execution of the flight path occurs after the initiation of scene capture and transmission. Though the steps of FIG. 6 can be performed in multiple orders, engaging scene detection as soon as the drone is active enables the most accurate scene detection (greater time spent observing leads to better observations).

In step 618, the SLAM drone determines whether to detonate. Like the SLAM grenade, the SLAM drone evaluates many of the same conditions. However, the SLAM drone additionally bases the determination to detonate on the completion of a flight path condition (e.g., fly within range of a non-allied person). Upon reaching the determination to detonate, in step 622, the drone completes the flight path, and then in step 624, detonates.

An Example Machine Overview

The machine-implemented operations described above can be implemented at least partially by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the embodiments introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Figure 7:
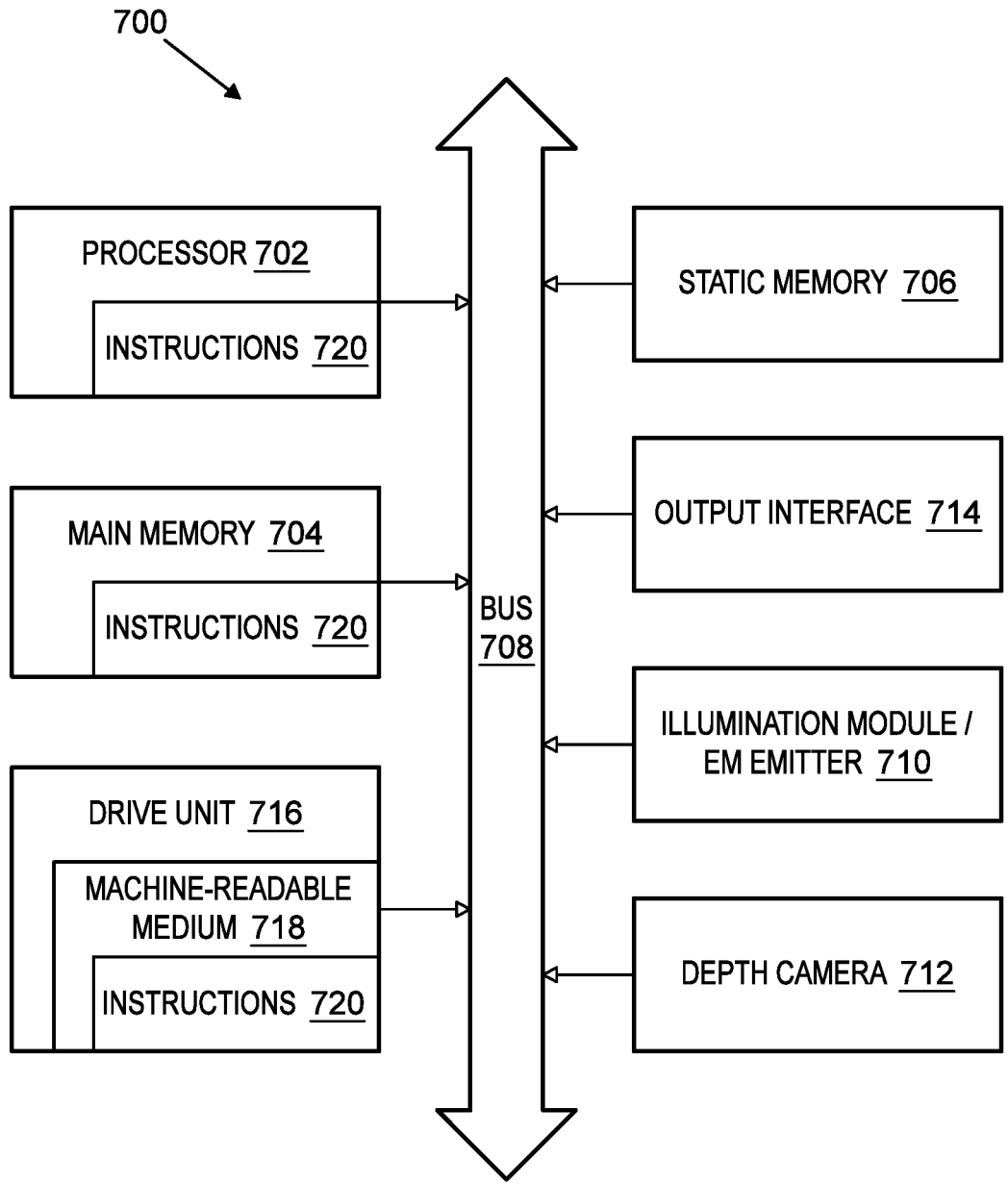
FIG. 7 is a block schematic diagram of a system in the exemplary form of a computer system within which a set of instructions for causing the system to perform any one of the foregoing methodologies and logical flows may be executed.

FIG. 7 is a block schematic diagram of a system in the illustrative form of a computer system 700 within which a set of instructions for causing the system to perform any one of the foregoing methodologies and logical flows may be executed.

The computer system 700 includes a processor 702, a main memory 704 and a static memory 706, which communicate with each other via a bus 708. The computer system 700 further includes an illumination module 710 and a depth camera 712. The computer system 700 also includes an output interface 714, for example, a USB interface, a network interface, or electrical signal connections and/or contacts.

The disk drive unit 716 includes a machine-readable medium 718 on which is stored a set of executable instructions, i.e., software 720, embodying any one, or all, of the methodologies described herein. The software 720 is also shown to reside, completely or at least partially, within the main memory 704 and/or within the processor 702. The software 720 may further be transmitted or received over a network by means of a network interface device 714.

In contrast to the system 700 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer-readable medium. A machine-readable medium includes any mechanism for storing or transmitting information in a form readable by a machine, e.g., a computer. For example, a machine-readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by Internet-enabled or network-enabled devices, servers, or clients and that do not require complex hardware configurations, e.g., requiring cables and complex software configurations, e.g., requiring a consultant to install. For example, embodiments may provide one or more cloud computing solutions that enable users, e.g., users on the go, to access real-time video delivery on such Internet-enabled or other network-enabled devices, servers, or clients in accordance with embodiments herein. It further should be appreciated that one or more cloud computing embodiments include real-time video delivery using mobile devices, tablets, and the like, as such devices are becoming standard consumer devices.

From the foregoing, it will be appreciated that specific embodiments of the invention have been described herein for purposes of illustration, but that various modifications may be made without deviating from the scope of the invention. Accordingly, the invention is not limited except as by the appended claims.

I claim:

1. A projectable device, comprising:
a detonation charge;
an image capturing device;
a processor operatively coupled to at least the detonation charge and the image capturing device; and
memory operatively coupled to the processor and storing thereupon a sequence of instructions which, when executed by the processor, cause the processor to perform a set of operations, the set of operations comprising:
transmitting at least some of image data captured by the image capturing device to a display system through a wireless connection between the projectable device and the display system; and
determining whether to prevent detonation or to initiate the detonation of the detonation charge based at least in part upon the at least some of the image data,
wherein the display system comprises a head-mounted display (HMD).

2. The projectable device of claim 1,
wherein the sequence of instructions includes one or more flight profiles pertaining to one or more corresponding flight paths; and
wherein the projectable device further comprises one or more powered devices that impart motion to the projectable device to traverse at least one of the one or more corresponding flight paths.

3. The projectable device of claim 2, wherein the one or more flight profiles comprise an observation profile configured to position the projectable device at a high location in a room.

4. The projectable device of claim 2, wherein the one or more flight profiles comprise a distraction profile configured to position the projectable device adjacent a person identified by analyzing the at least some of the image data.

5. The projectable device of claim 2, wherein the one or more flight profiles comprise a maximum damage profile configured to position the projectable device at a central point between a plurality of people identified by analyzing the at least some of the image data.

6. The projectable device of claim 1, wherein an input is provided by a mixed-reality system or an environmental input detected by the projectable device.

7. The projectable device of claim 1, wherein determining whether to prevent detonation or to initiate the detonation of the detonation charge comprises:
capturing the image data by the image capturing device;
analyzing the at least some of the image data to generate an analysis result;
determining whether one or more head-mounted display (HMD) devices or a friendly person is present within a range threshold from the projectable device based at least in part upon the analysis result of the at least some of the image data to generate a determination result; and
preventing the detonation of the detonation charge based at least in part upon the determination result.

8. The projectable device of claim 1, wherein determining whether to prevent detonation or to initiate the detonation of the detonation charge comprises:
capturing the image data by the image capturing device;
analyzing the at least some of the image data to generate an analysis result;
determining whether the analysis result includes information describing a target for detonation for the projectable device to generate a determination result; and
initiating the detonation of the projectable device based at least in part upon a threshold range pertaining to the detonation charge.

9. A projectable device, comprising:
a detonation charge;
a safety mechanism that prevents detonation of the detonation charge;
a motion sensor that captures at least one motion characteristics of the projectable device;
an image capturing device, wherein the projectable device is configured to perform a set of operations, the set of operations comprising:
transmitting at least some of image data captured by the image capturing device to a display system through a wireless connection between the projectable device and the display system; and
determining whether to prevent detonation or to initiate the detonation of the detonation charge based at least in part the at least some of the image data.

10. The projectable device of claim 9, wherein the display system comprises a head-mounted display (HMD).

11. A method, comprising:
establishing a wireless connection between a projectable device and a display system, the wireless connection enabling communication between the projectable device and the display system;
transmitting at least some of image data captured by an image capturing device to the display system through the wireless connection between the projectable device and the display system; and determining whether to prevent detonation or to initiate the detonation of a detonation charge based at least in part upon the at least some of the image data, wherein the display system comprises a head-mounted display (HMD).

12. The method of claim 11, further comprising directing the projectable device to traverse at least one or more flight paths corresponding to one or more flight profiles.

13. The method of claim 12, wherein the one or more flight profiles comprise an observation profile configured to position the projectable device at a high location in a room.

14. The method of claim 12, wherein the one or more flight profiles comprise a distraction profile configured to position the projectable device adjacent a person identified by analyzing the at least some of the image data.

15. The method of claim 12, wherein the one or more flight profiles comprise a maximum damage profile configured to position the projectable device at a central point between a plurality of people identified by analyzing the at least some of the image data.

16. The method of claim 11, wherein determining whether to prevent the detonation or to initiate the detonation of the detonation charge comprises:

capturing the image data by the image capturing device;

analyzing the at least some of the image data to generate an analysis result;

determining whether one or more head-mounted display (HMD) devices or a friendly person is present within a range threshold from the projectable device based at least in part upon the analysis result of the at least some of the image data to generate a determination result; and preventing the detonation of the detonation charge based at least in part upon the determination result.

17. The method of claim 11, wherein determining whether to prevent the detonation or to initiate the detonation of the detonation charge comprises:

capturing the image data by the image capturing device;

analyzing the at least some of the image data to generate an analysis result;

determining whether the analysis result includes information describing a target for detonation for the projectable device to generate a determination result; and initiating the detonation of the projectable device based at least in part upon a threshold range pertaining to the detonation charge.

18. The method of claim 11, wherein the image data includes stale data;

the method further comprising displaying the stale data differently than non-stale data.

* * * * *